(12) United States Patent
Irwin et al.

(10) Patent No.: US 9,033,373 B2
(45) Date of Patent: May 19, 2015

(54) AXIALLY SWAGED FITTING

(75) Inventors: James P. Irwin, Renton, WA (US); Michael E. Rorabaugh, Seattle, WA (US); Benjamin A. Johnson, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 379 days.

(21) Appl. No.: 13/100,704

(22) Filed: May 4, 2011

(65) Prior Publication Data

US 2012/0280498 A1    Nov. 8, 2012

(51) Int. Cl.
 *F16L 13/14*    (2006.01)

(52) U.S. Cl.
 CPC ................... *F16L 13/146* (2013.01)

(58) Field of Classification Search
 USPC ............ 285/148.11, 286.2, 382.2, 382.7
 See application file for complete search history.

(56) References Cited

U.S. PATENT DOCUMENTS

| 591,828 A | 10/1897 | Duncan |
| 3,675,949 A | 7/1972 | Dawson |
| 3,794,360 A | 2/1974 | Bachle et al. |
| 4,296,804 A | 10/1981 | Press et al. |
| 4,705,302 A | 11/1987 | Beiley |
| 5,181,752 A | 1/1993 | Benson et al. |
| 5,405,176 A | 4/1995 | Babel et al. |
| 5,560,661 A | 10/1996 | Babel et al. |

FOREIGN PATENT DOCUMENTS

DE    3400638    7/1985

OTHER PUBLICATIONS

*Aviation Maintenance Technician Handbook*, Chapter 7, pp. 7-1 through 7-22, by the U.S. Department of Transportation, Federal Aviation Administration, http://www.faa.gov/library/manuals/aircraft/amt_handbook/media/FAA-8083-30_CH07.pdf (2008).
European Search Report and Opinion, European Application No. 12160069.6 (Sep. 19, 2012).
Examination Report, European Application No. 12160069.6 (Nov. 11, 2013).

*Primary Examiner* — Daniel P Stodola
*Assistant Examiner* — Gwendolyn Driggers
(74) *Attorney, Agent, or Firm* — Thompson Hine LLP (57) ABSTRACT

An axially swaged fitting for use in permanently coupling tubes together. The swaged fitting may be useful in coupling metal hydraulic lines to one another in an airplane. According to one embodiment, the swaged fitting includes a sleeve with a hard metal surface and a swaging ring with a soft metal surface, such that during the swaging process the soft metal surface of the swaging ring is deformed.

17 Claims, 6 Drawing Sheets

FIG. 8

AXIALLY SWAGED FITTING

FIELD OF THE DISCLOSURE

The present disclosure relates to fluid fittings for connection to tubes and pipes by swaging and, more particularly, to a swagable fitting having an axially movable swaging ring for applying radial swaging force.

BACKGROUND

Permanent fittings are commonly used for connecting metal tubes and pipes to eachother for use in a variety of applications, for example for the conveyance of hydraulic control fluids in the aerospace industry. In this application, the connection between the tubes and fitting must be secure in order to withstand vibrations and adverse conditions.

One type of commonly used fitting is an axially swaged fitting, such as the Rynglok (trademarked product) fittings manufactured by Eaton Corporation. Other axially swaged fittings are available and utilize substantially similar construction and methods to swage the fitting onto a tube. Another example of these axially swaged fittings are the Permalite (trademarked product) brand from Permaswage. These axially swaged fittings utilize a sleeve surrounding the tubes to be joined and one or more swaging ring about the sleeve. The ring and sleeve have complimentary geometry such that as the swaging ring is positioned onto the sleeve, the sleeve collapses the tube to thereby swage the pieces together.

In order to effectuate the swaging process, a lubricant may be placed between the sleeve and swaging ring, thereby allowing the swaging process by reducing friction between the ring and sleeve. This reduces the chance of scarring or gouging the surface of either the ring or sleeve which may cause the swaging ring to lock up and be unable to complete the swaging process, or may damage the ring or sleeve.

The wing of an aircraft requires a number of hydraulic control lines to operate control structure on that portion of the aircraft. These control lines require a significant amount of open space, and may therefore be passed through the fuel storage sections on the wings of the aircraft. There are therefore a large number of fittings adjacent the fuel of the aircraft, and therefore care must be taken to ensure a secure and safe connection.

Electrical events are possible in the hydraulic lines, for example due to system fault or other anomalies in the hydraulic system, and this may cause electrical current to flow along one or more of the tubes. It has previously been assumed that as the electrical current flows from one tube to another through the fitting that the current flows from the first tube, through the sleeve, and then to the second tube, with the swaging rings being outside of the current path. This path of electrical current ensures that current flows cleanly through the fitting without discharges or excess heat buildup.

However, further investigation has revealed that the swaging rings are within the current path, and current travels from the first tube, through the sleeve, to the first swaging ring, back to the sleeve, to the second swaging ring, back to the sleeve, and finally to the second tube. Any lubrication remaining around or between the swaging rings and sleeve may therefore be within the electrical path. Because of the low electrical conductivity of the lubricant, as current flows through the material it acts as a resistor and heats up. This is undesirable for hydraulic lines which run through a fuel storage area, such as on an airplane. Prior art axially swaged fittings do not address this problem, and therefore may be unsuitable for providing a complete conductive path from one tube to another through the swaged fitting. It is therefore a principal object of the present disclosure to provide an axially swaged fitting which provides a complete conductive path through metal components to eliminate the risk of sparking or heat buildup in an axially swaged fitting.

While this problem is identified primarily with respect to aircraft, the apparatus may be used in other applications including, without limitation, watercraft, space vehicles, submarines, automobiles, buildings, industrial hydraulic lines, unmanned vehicles, or any other application. The apparatus may also be used for other, non-hydraulic systems in the same manner as traditional swaged fittings.

Therefore, there is proposed a novel axially swaged fitting which eliminates the problems of the prior art.

SUMMARY OF THE DISCLOSURE

According to one embodiment of the disclosure, an axially swaged fitting for joining to a tube is disclosed. The fitting consists of a sleeve that fits about the tube and a ring that fits about the sleeve. The ring is adapted to slide over the sleeve to thereby deform the sleeve and tube, thereby creating a permanent metal-to-metal electrically bonded joint. The sleeve preferably includes a hard or soft metal layer, while the ring includes the other of a soft or hard metal layer, so that the soft metal is deformed during the swaging process.

Also disclosed is a method for connecting a fitting to a tube by axially swaging. This method includes the steps of providing a tube, a swaging sleeve, and a swaging ring, positioning the tube within the sleeve and the ring about the sleeve and tube, and axially swaging the ring onto the sleeve, thereby deforming the tube and forming a mechanical joint. The inner surface of the ring and outer surface of the sleeve are selected to be opposing hard and soft metals.

According to a further embodiment, a method of making an axially swageable fitting is described. The method includes the steps of providing a sleeve and a ring adapted to be joined together by axial swaging. A sleeve mating metal is applied to the outside surface of the sleeve and a ring mating metal is applied to the inner surface of the ring. The sleeve and ring mating metal are selected so that one is a hard metal and the other is a soft metal.

The features, functions, and advantages that have been discussed can be achieved independently in various embodiments of the present invention or may be combined in yet other embodiments further details of which can be seen with reference to the following description and drawings.

DETAILED DESCRIPTION

Figure 1:
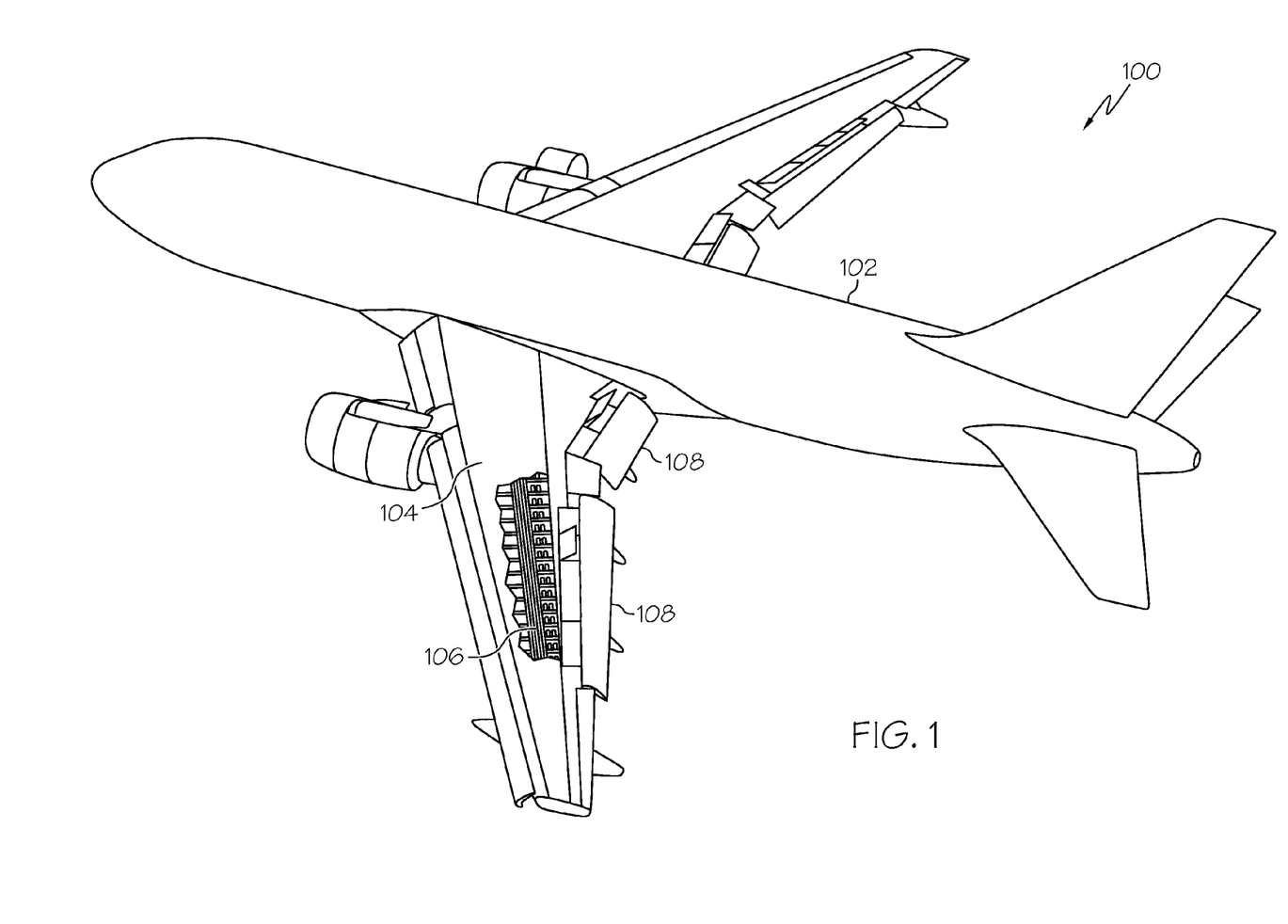
FIG. 1 is a perspective view of an aircraft with a cutaway view of the wing.

FIG. 1 illustrates an airplane 100 having a fuselage 102 and wing 104. Extending from the fuselage 102 are a number of hydraulic lines 106 which pass through a portion of the wing 104 which traditionally includes fuel storage. These hydraulic lines 106 are used to control flaps 108 on the wing, and may include a number of fittings 110, as shown in FIG. 2.

While the present apparatus is shown in the context of airplanes, it will be understood by those having skill in the art that this apparatus may be utilized in other applications. Such applications include, without limitation, industrial hydraulic systems, automotive components, or other hydraulic applications. The apparatus may also be used in non-hydraulic systems, and may replace any other swaged fitting as appropriate.

Figure 2:
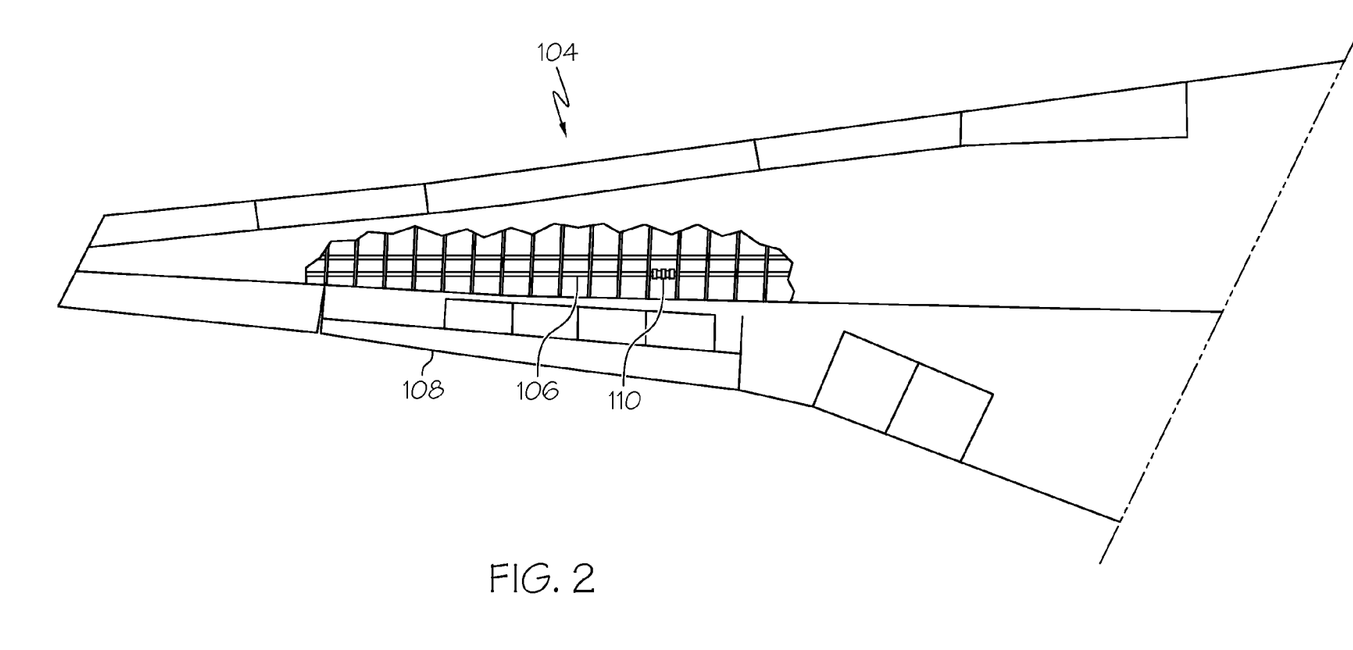
FIG. 2 is a top cutaway view of the aircraft wing in further detail.

FIG. 2 shows a closer detail of the wing 104 and the location of fittings 110 along the hydraulic lines 106.

Figure 3A:
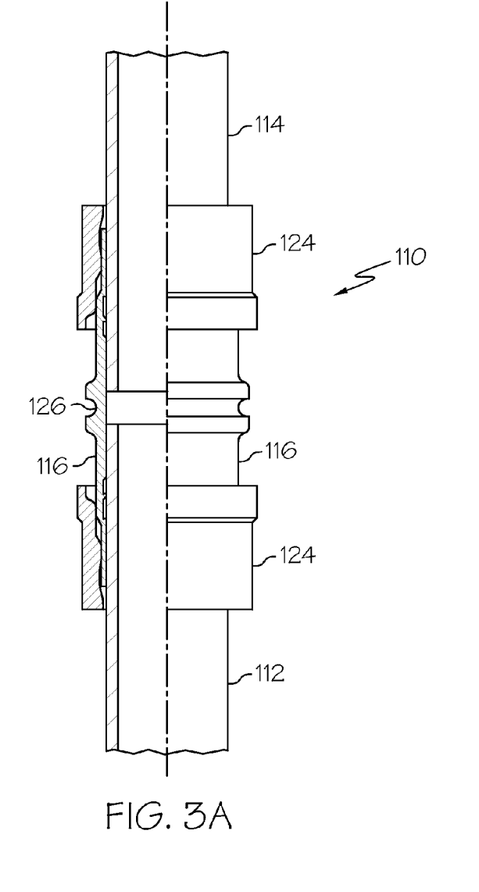
FIG. 3A is a side cutaway view of the pre-swaged fitting.
Figure 3B:
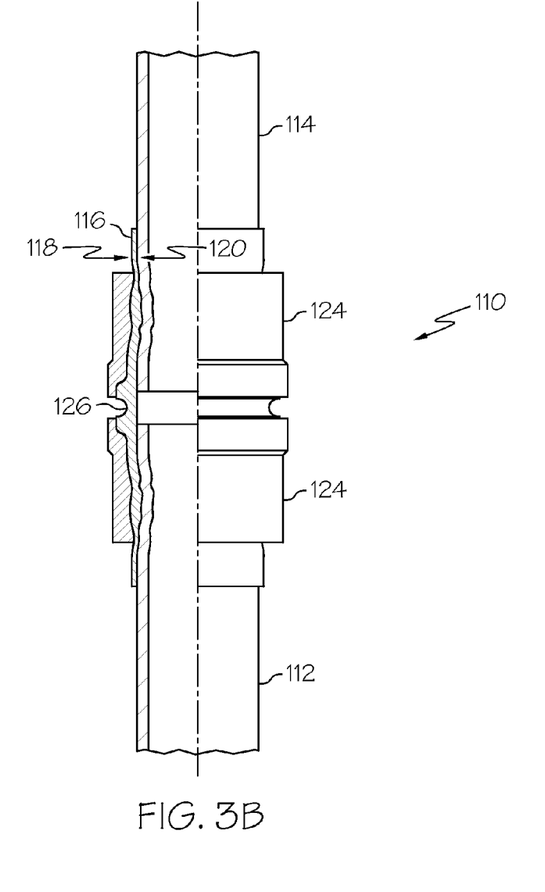
FIG. 3B is a side cutaway view of the swaged fitting.

FIGS. 3A-B shows a view of the fitting 110 for use in connecting first 112 and second 114 tubes to each other in axial alignment. The fitting generally consists of a substantially cylindrical sleeve 116 with an outer surface 118, inner surface 120, and an axial bore 122 (FIG. 5) for receiving the tubes 112, 114. In one embodiment, the fitting 110 further includes a swaging ring 124 which may be swaged onto the sleeve 116 to permanently secure the tubes 112, 114 thereto.

As further shown in FIG. 3A, the sleeve 116 has a symmetrical configuration opposite an annular grove 126. For ease of reference and shown in FIG. 5, only one of these portions will be described. It will be understood that the opposite side of the sleeve 116 is structurally and functionally identical to the side described. It is also to be understood that the fitting may be constructed of one or more of these configurations.

Figure 4A:
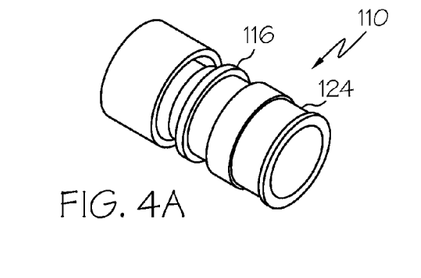
FIG. 4A is a top plan view of one embodiment.
Figure 4B:
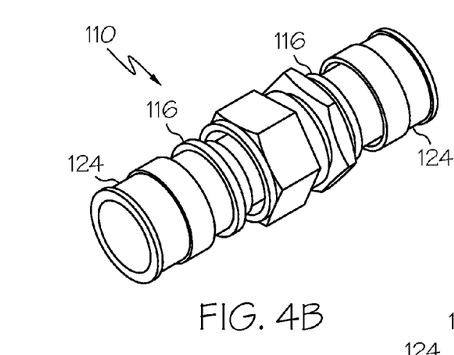
FIG. 4B is a top plan view of an alternative embodiment.
Figure 4C:
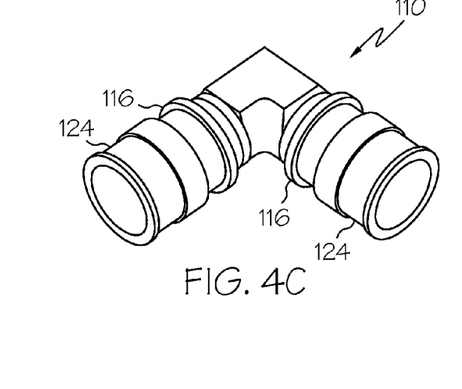
FIG. 4C is a top plan view of an alternative embodiment.
Figure 4D:
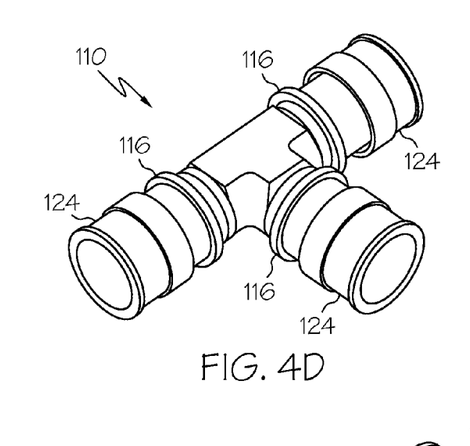
FIG. 4D is a top plan view of an alternative embodiment.
Figure 4E:
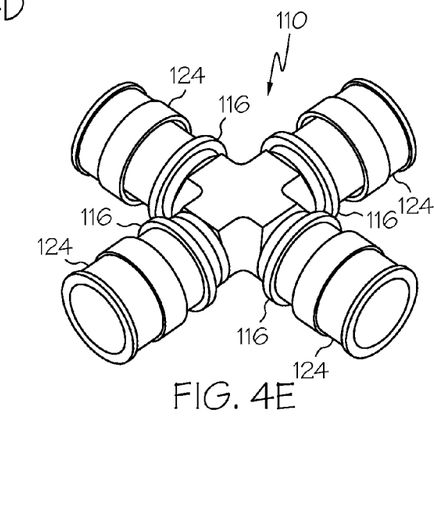
FIG. 4E is a top plan view of an alternative embodiment.

FIGS. 4A-E show several (non-exclusive) examples of these arrangements, including a fitting with a single swaged end (FIG. 4A), a straight fitting (FIG. 4B), an elbow fitting (FIG. 4C), a tee fitting (FIG. 4D) and a cross fitting (FIG. 4E). Joining of multiple portions may be accomplished according to means well known in the art.

Figure 5:
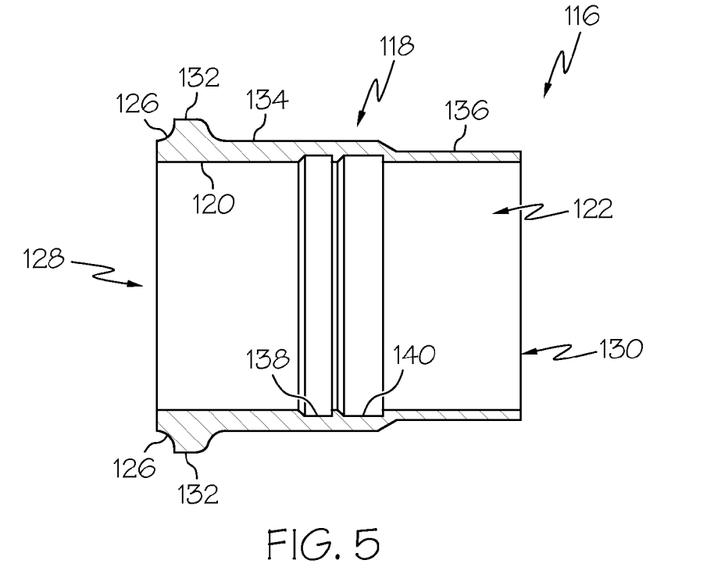
FIG. 5 is a side cutaway view of a portion of the sleeve.

FIG. 5 shows one embodiment of one portion of the sleeve 116 in closer detail. As shown, the portion of the sleeve 116 extends between an inner end 128 and an outer end 130. An outer surface 118 forms the exterior of the cylindrical sleeve 116 and an inner surface 120 defines an axial bore 122 for receiving a tube 112 (FIG. 3A). An annular groove 126 is positioned adjacent the inner end 128. Immediately adjacent the annular groove 126 is an annular lip 132 which extends about the sleeve 116 and provides a grip for a swaging tool to swage the swaging ring 124 (see FIG. 3A) and sleeve 116. Adjacent to the annular lip 132 is a first surface 134 extending towards the outer end 130. This first surface 134 portion of the sleeve 116 has a smaller diameter than that of the annular lip 132. At a point between the inner end 128 and outer end 130, the first surface 134 is stepped to a second surface 136, the second surface 136 having a smaller diameter than the first surface 134. This second surface 136 extends from the first surface 134 to the outer end 130 of the sleeve 116. Each of the first surface 134 and second surface 136 may have a substantially constant diameter, or alternatively may taper from a larger diameter at the inner end 128 towards a smaller diameter towards the outer end 130. Alternatively, the sleeve 116 may include annular ridges to provide mechanical locking for the swaging ring 124 (see FIG. 6). Other arrangements of a mechanical interference fit that are known in the art may be substitute for the above-described arrangement.

The inner surface 120 of the sleeve 116 may also include unique geometry. The inner surface 120 may include two or more annular gaps 138, 140 axially spaced apart from one another. These annular gaps 138, 140 provide space for the material of the tube 112, 114 (FIG. 3B) to be displaced into when the swaging ring 116 is swaged in place. The use and function of such annular gaps 138, 140 are well known and described in the prior art. Other gap geometry or means for causing the sleeve 116 to securely engage the tube 112 are known and may be substituted for annular gaps 138, 140, such means will be readily apparent to those skilled in the art.

Figure 6:
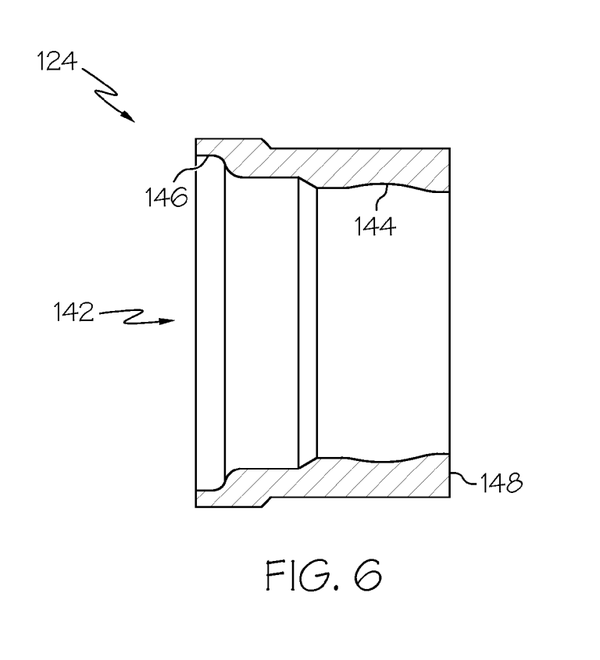
FIG. 6 is a side cutaway view of the swaging ring.

FIG. 6 shows a further detail of one of the swaging rings 124 used to secure the sleeve 116 to the tube 112 (FIG. 3A). As shown, the swaging ring 124 generally comprises a cylindrical shape having a central opening 142 for receiving the sleeve 116. The central opening 142 further includes a receiving surface 144 and a gap 146 for fitting over the annular lip 132 (see FIG. 5). The receiving surface 144 is shown having a curved or wavy circumference, however it will be appreciated that this surface may be textured, tapered, flat, or otherwise adapted to engage and deform the sleeve 116 (FIG. 3A) so as to secure the tube 112 (FIG. 3A) by axial swaging. A swaging tool (not shown) grips the outer edge 148 of the ring 124 to move it over the sleeve 116, thereby swaging the sleeve 116 and tube 112, 114.

The process of axial swaging is generally shown in FIGS. 3A-3B. First, a sleeve 116 is provided with swaging rings 124 positioned on either end of the sleeve 116. As shown in FIG. 3A, the receiving surface 144 (FIG. 6) is positioned adjacent the second surface 136 (FIG. 5). Next, a tube 112, 114 is inserted into the sleeve through the swaging ring 124. Finally, a swaging tool (not shown) grips the annular lip 132 (FIG. 5) of the sleeve 116 and the outer edge 148 (FIG. 6) of the swaging ring 124. The tool then draws the swaging ring 124 and sleeve 116 together so that the annular lip 132 of the sleeve 116 is positioned within the gap 146 of the swaging ring 124. As the swaging ring 124 is drawn onto the sleeve 116, the receiving surface 144 is drawn onto the first surface 134 which deforms into the tube 112, 114. This arrangement is shown in FIG. 3B. A lubricant (not shown) may also be placed between the swaging ring 124 and sleeve 116 to encourage the swaging process.

As shown in FIG. 3B, as the swaging ring 124 engages the sleeve 116 in an axial direction, the receiving surface 144 (FIG. 6) of the swaging ring 124 moves from the second surface 136 to the first surface 134. The receiving surface 144 of the swaging ring has a progressively diminishing diameter, and as it engages the first surface 134, the sleeve 116 is compressed into the tube 112, 114. The annular gaps 138, 140 of the sleeve (FIG. 5) encourage this deformation, which pinches the tube 112, 114 into an hourglass shape that inhibits movement of the tube 112, 114 from the sleeve 116.

Figure 7:
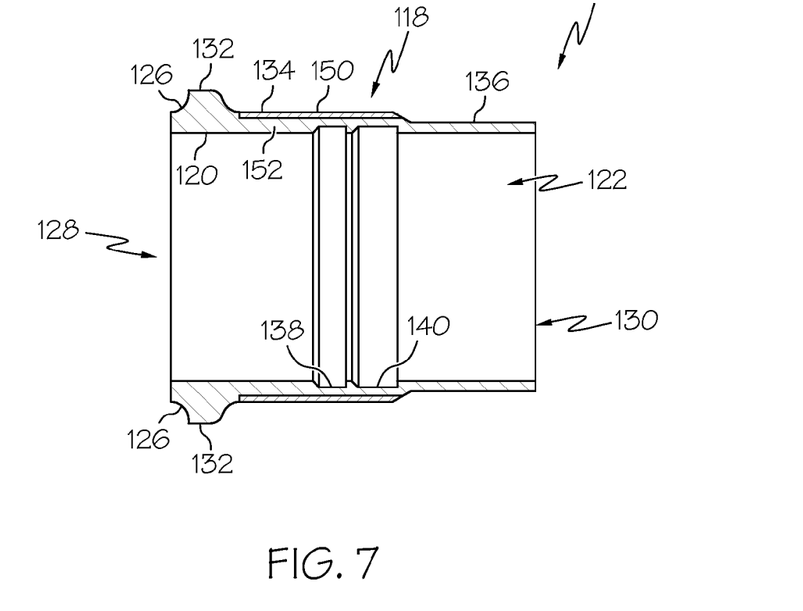
FIG. 7 is a side cutaway view of the sleeve according to an alternative embodiment.

As shown in FIG. 7, the sleeve 116 may be structurally identical to the previous description, but comprise an outer layer 150 as a slip surface applied onto the inner material 152 that forms the sleeve 116. The outer layer 150 may be made of a hard metal, examples of hard metals include a group comprising vanadium, chromium, nickel, rhodium, palladium, tantalum, and certain steel alloys. The inner material 152 constitutes the remainder of the sleeve and may be selected for resistance to hydraulic pressure, and may be selected from a group comprising titanium, aluminum, CRES, or other material. One method of applying the outer layer 150 to the inner material 152 is by electrostatic plating, although other methods are well known in the art.

Figure 8:
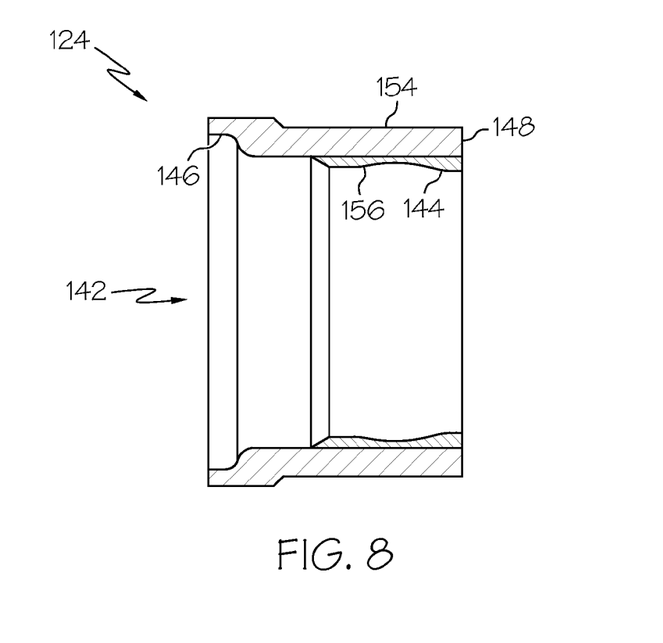
FIG. 8 is a side cutaway view of the ring according to an alternative embodiment.

As shown in FIG. 8, the swaging ring 124 may be structurally identical to the previous description, but comprise an outer material 154 and inner layer 156. The swaging ring 124 is preferably formed entirely of the outer material 154 except for the inner layer 156. The outer material 154 is selected for its resistance to forces due to hydraulic pressure and swaging, and may be constructed from a group comprising titanium, aluminum, CRES, or other material. The inner layer 156 is manufactured from a metal which is soft relative to the hard metal of the outer layer 150 of the sleeve 116. Examples of soft metals include a group comprising aluminum, copper, gallium, silver, cadmium, indium, tin, antimony, platinum, gold, thallium, bismuth, lead, alloys of the foregoing, and certain steel alloys. As with the sleeve 116, the inner layer 156 may be applied to the swaging ring 124 by, for example, electrostatic plating, although other methods of forming a relatively thin layer of metal are well known in the art.

Providing a hard metal outer material 150 on the sleeve 116 provides a rub surface that resists scarring that may occur if the ring and sleeve are uniform materials. In contrast, the soft metal of the inner layer 156 of the swaging ring 124 provides a slip surface that will scar as the swaging ring 124 slides over the sleeve 116. This mating metal layer arrangement ensures continuous metal-to-metal contact between the ring and sleeve, thereby creating a constant electrical path so that when there is an electrical event, current may be transferred directly from the sleeve 116 to the ring 124.

The swaging ring 124 and sleeve 116 have been generally described as including a layer of either a hard or soft metal. However, it is also contemplated that the entire sleeve 116 or ring 124 may be constructed of either a hard or soft metal as described. The proportion of the sleeve 116 and/or ring 124 that includes a hard or soft metal may be determined according to the particular use to which the product is applied, and may range from a narrow strip to the entire sleeve 116 or ring 124. The arrangement of both portions of the sleeve 116 and ring 124 may be different, again according to use.

As previously described, the Rynglok fittings have been described and serve as an example of the type of axially swaged fitting which may be utilized with this disclosure. Other variations of axially swaged fittings may be used without departing from the scope of the disclosure. For example, the above-cited Permalite brand of fittings may be utilized. These fittings may differ in form from the described Rynglok fittings (for example, omitting gap 146, although other structure may be added or removed from the fitting), but function similarly by axially swaging the fitting to the tube.

According to an alternative embodiment, the slip and rub surfaces may be switched, so that the hard metal rub surface is located on the swaging ring 124 while the soft metal slip surface is located on the sleeve 116.

What is claimed is:

1. An axially swaged fitting for joining to a tube, the fitting comprising:
   a sleeve comprising as inner material and a swaging ring comprising an outer material and sliding over the sleeve when forced in an axial direction to deform the sleeve and said tube to thereby create a swaged joint;
   a first mating metal layer located between the sleeve and the swaging ring, the first mating metal layer being on one of the sleeve and the swaging ring and comprising a relatively hard metal; and
   a second mating metal layer located between the sleeve and the swaging ring, the second mating metal layer being on the other of the sleeve and swaging ring and comprising a relatively soft metal, so that engagement of the first mating metal layer and the second mating metal layer deforms the soft metal during a swaging of the sleeve and the swaging ring and forms a continuous metal-to-metal contact between the swaging ring and the sleeve, creating a constant electrical path between the swaging ring and the sleeve.

2. The fitting of claim 1, wherein the first mating metal layer is on the sleeve.

3. The fitting of claim 2, wherein the second mating metal layer is on the swaging ring.

4. The fitting of claim 3, wherein the hard metal is selected from a the group consisting of: vanadium, chromium, nickel, rhodium, palladium, and tantalum.

5. The fitting of claim 4, wherein the soft metal is selected from a group consisting of: aluminum, copper, gallium, silver, cadmium, indium, tin, antimony, platinum, gold, thallium, bismuth, and lead.

6. The fitting of claim 1, wherein the first mating metal layer is on the swaging ring.

7. The fitting of claim 6, wherein the second mating metal layer is on the sleeve.

8. The fitting of claim 7, wherein the hard metal is selected from a group consisting of: vanadium, chromium, nickel, rhodium, palladium, and tantalum.

9. The fitting of claim 8, wherein the soft metal is selected from a group consisting of: aluminum, copper, gallium, silver, cadmium, indium, tin, antimony, platinum, gold, thallium, bismuth, and lead.

10. A method of making an axially swageable fitting for joining two or more tubes, the method comprising:
    providing a sleeve having an internal bore for receiving two tubes to be joined, and an external surface having
        an inner end,
        an outer end,
        an annular groove adjacent an inner surface,
        an annular lip adjacent the annular groove,
        a first surface extending from the annular lip to a point between the inner end and the outer end, and
        a second surface extending from the first surface to the outer end,
    providing a swaging ring having an outer surface and an inner surface, wherein the inner surface is shaped to form a mechanical interference fit with the outer surface of the sleeve when said swaging ring is swaged to the sleeve;
    applying a swaging ring inner layer to the inner surface of the swaging ring; and
    applying a sleeve mating outer layer to the outer surface of the sleeve;
    wherein one of the swaging ring inner layer and the sleeve outer layer is a relatively hard metal and the other of the swaging ring inner layer and the sleeve outer layer is a relatively soft metal, the swaging ring inner layer and the sleeve outer layer engaging each other during swaging such that the relatively soft metal is deformed and forms a continuous metal-to-metal contact between the swaging ring and the sleeve, and creates a constant electrical path between the swaging ring and the sleeve.

11. The method of claim 10, wherein the relatively hard metal is selected from a group consisting of: vanadium, chromium, nickel, rhodium, palladium, and tantalum.

12. The method of claim 11, wherein the relatively soft metal is selected from a group consisting of: aluminum, copper, gallium, silver, cadmium, indium, tin, antimony, platinum, gold, thallium, bismuth, lead, an alloy of the foregoing, and steel alloys.

13. The method of claim 12, wherein the swaging ring and the sleeve mating metals are plated onto the swaging ring and the sleeve.

14. A method of connecting a fitting to a tube by axially swaging, the method comprising:
providing the tube;
providing a sleeve having an inner material with an outer surface, the outer surface including a mating metal layer comprising one of a relatively hard and a relatively soft metal;
providing a swaging ring having an outer material with an inner surface, the inner surface shaped to form a mechanical interference with the outer surface, the inner surface including a swaging ring mating metal layer comprising the other of the relatively hard and the relatively soft metal;
positioning the tube within the sleeve;
positioning the swaging ring about the sleeve and the tube; and
axially swaging the swaging ring onto the sleeve to deform the tube, thereby forming a mechanical joint, during the swaging of the sleeve and the swaging ring, engagement of the mating metal layer of the sleeve with the mating metal layer of the swaging ring deforms the soft metal to form a continuous metal-to-metal contact between the swaging ring and the sleeve, and creates a constant electrical path between the swaging ring and the sleeve.

15. The method of claim 14, wherein the relatively soft metal is selected from a group consisting of: aluminum, copper, gallium, silver, cadmium, indium, tin, antimony, platinum, gold, thallium, bismuth, lead, an alloy of the foregoing, and certain steel alloys.

16. The method of claim 14, wherein the relatively hard metal is selected from a group consisting of: vanadium, chromium, nickel, rhodium, palladium, and tantalum.

17. The method of claim 14, wherein the sleeve further includes an annular groove.

* * * * *